ated June 9, 1908.
UNITED STATES PATENT OFFICE.

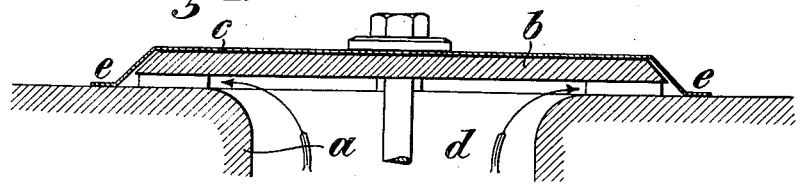
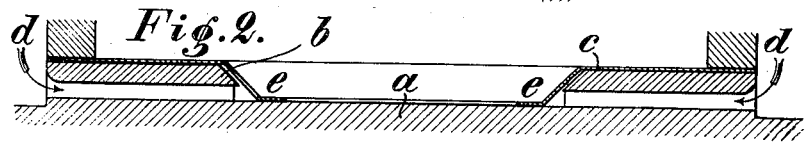
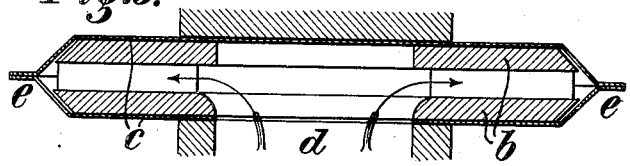
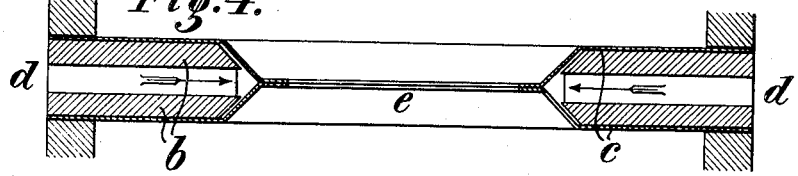
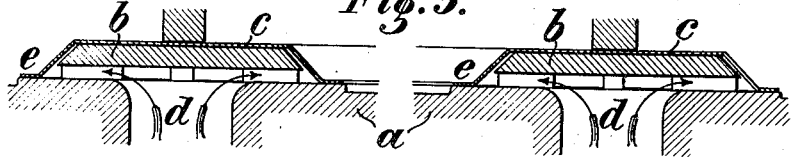
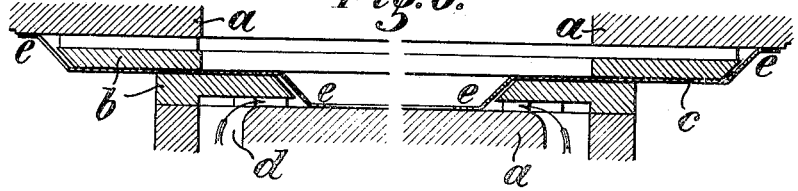

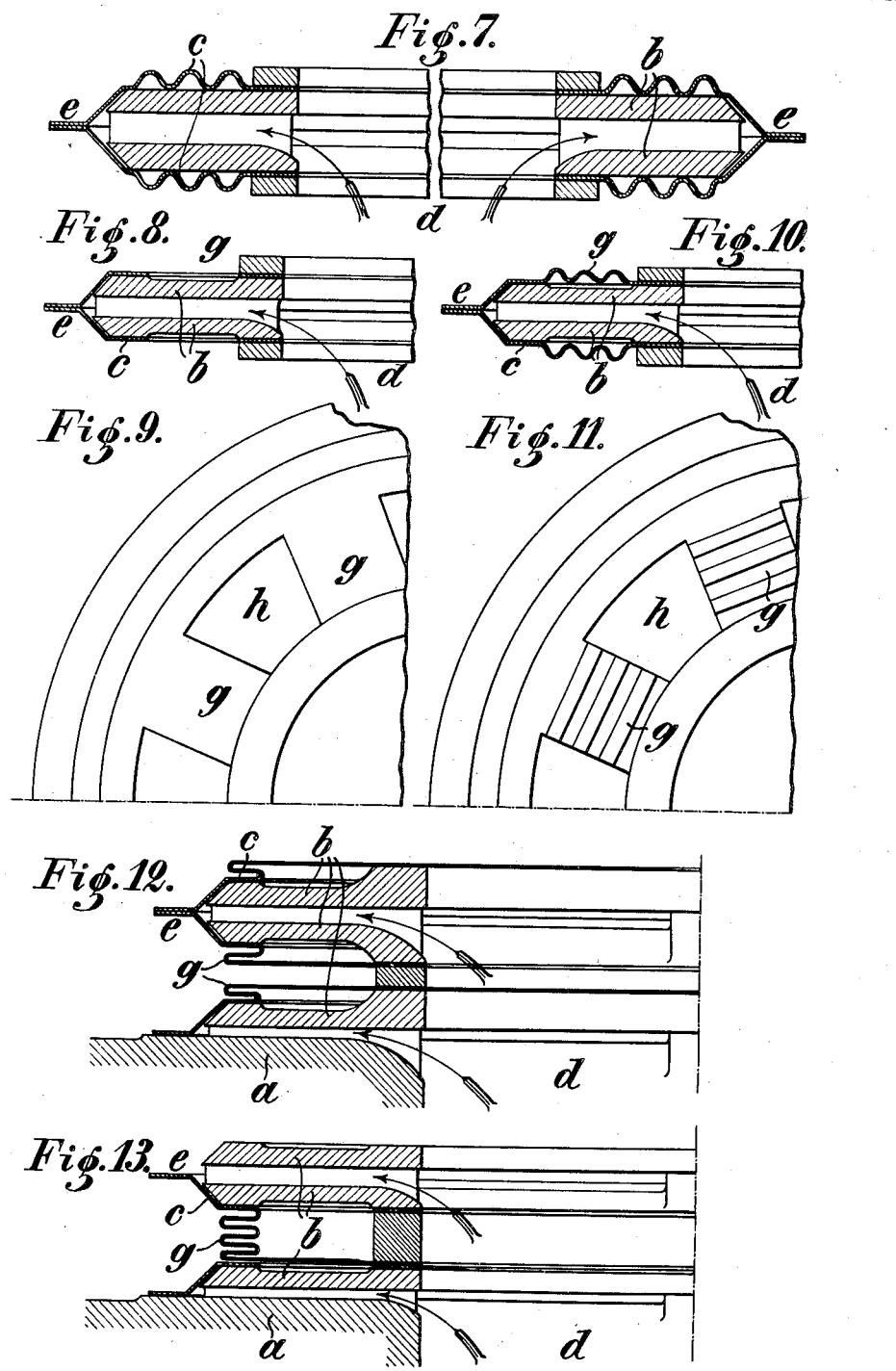

PAUL BRENNER, OF DUSSELDORF, AND OTTO HOFFMANN, OF FREIBURG, GERMANY.

AUTOMATIC VALVE FOR PUMPS.

No. 890,121.  Specification of Letters Patent.  Patented June 9, 1908.

Application filed December 24, 1907. Serial No. 407,960.

*To all whom it may concern:*

Be it known that we, PAUL BRENNER, Geibelstrasse 57, Dusseldorf, and OTTO HOFFMANN, Belforterstrasse 27, Freiburg, Germany, subjects of the German Emperor, have invented a new and useful Automatic Valve for Pumps, of which the following is a full and complete specification.

The subject of the present invention is an automatic valve for plunger pumps, blast fans and compressors and which is specially suited for employment in highspeed pumps.

In the accompanying drawings: Figure 1 is a cross section through our improved valve; Figs. 2–8, and Fig. 10 are similar sections through modifications thereof; Figs. 9 and 11 are plan views, partly broken away, of the valves shown in Figs. 8 and 10, respectively, and Figs. 12 and 13 are cross sections through further modifications of the valve.

The valve consists, as shown in Fig. 1, of a solid seat $a$ and the dished valve body $e$ of thin metal, hardened rubber or similar material, the edge of which rests on the seat at $e$. The valve body incloses a solid, immovable supporting surface or platform $b$, which is so arranged that, when the valve is closed, the bottom of the valve body rests flat and the pressure of the water or other liquid being pumped, is exerted only on a portion of the downward bent edge. The valve is opened by the pressure of the water &c., entering at $d$ and lifting the key shaped valve body from its seat $a$, while the bottom, which is in itself, elastic, affords a means of closing it. When the valve is open, the water escapes at $d$ between the surface of the seat $a$ and the supporting plate $d$, when it flows without changing its direction between the seat $a$ and the rim or edge $e$ in every direction. The rim of the valve body and the seat, may be counter sunk.

In the mode of construction as shown in Fig. 2, the valve body and the supporting surface, are ring-shaped. The water &c., enters at the exterior periphery of the ring between $a$ & $b$ and is ejected between $a$ & $e$ towards the center of the ring.

The valve shown in Fig. 3, has two ring shaped valve bodies $c$ and supporting surfaces $b$. These parts are so connected that their outer peripheries culminate at $e$, so obviating the necessity for a solid valve seat as each of the surfaces forms a seat for the other. The two supporting surfaces $b$ inclosed by the valve body are suitably spaced by pegs, in order that the water &c., may pass between the two supporting surfaces and escape between the two surfaces $e$. Similar pairs of valves may be arranged one above another for the purpose of affording greater facility for the passage of large volumes of water.

Fig. 4 shows the union of two valves, as described in Fig. 2 with exterior influx and interior outflow.

In Fig. 5, a ring-shaped or annular valve $b$, $c$, is shown, so that the liquid may escape along the inner and outer periphery of the annulus.

The valve shown in Fig. 6 with one ring-shaped valve body $c$, two ring shaped supporting surfaces $b$ and two rigid seats $a$, is a combined suction and pressure valve. Key shaped and circular key-shaped valve bodies as represented in Fig. 6, and constructed of thin metal, hardened rubber &c., give only a relatively small valve opening, as the bottom is not so elastic.

In order to increase the elasticity, the bottoms of the valve bodies $c$ in the constructions shown in Fig. 7, are furnished with concentric ribs.

In the valve shown in Figs. 8 & 9 the spring or elasticity is increased thereby, that in the annular valve bodies $c$, there are parts $h$ cut out, leaving only radial ribs $g$. These ribs $g$ may be flat or sharp. Figs. 10, 11 & 12 show examples of the employment of this latter mode. These ribs may, as shown in Fig. 13, also be made to form springs.

In the case of the construction shown in Figs. 8 to 13, the annular valve body $c$ must be made to fit closely to the supporting plates at the cut away parts; if necessary it could be countersunk.

Having now fully described our invention, what we claim as new and desire to secure by Letters Patent is:

1. A device of the character described, comprising a valve seat, a platform spaced therefrom to form an intervening discharge slot, and a dished valve body supported by the platform in its movement towards the seat, said valve body being so held as to be flexible in a portion of its area which in seating contacts with the platform, substantially as specified.

2. A device of the character described, comprising a valve seat, a support spaced therefrom to form an intervening discharge slot, a dished resilient valve body projecting movably over the edge of the support, and means for securing said valve body centrally to said support, substantially as specified.

Signed by me at Dusseldorf this 11th day of December 1907.

PAUL BRENNER.

Witnesses:
WILHELM FLASCHE,
CLEMENT HECKMANN.

Signed by Mr. Hoffmann at Freiburg Baden this 12th day of December, 1907.

OTTO HOFFMANN.

Witnesses:
MORITZ RAUPP,
W. A. LEONARD